(12) United States Patent  
Matsuda

(10) Patent No.: US 7,587,263 B2
(45) Date of Patent: Sep. 8, 2009

(54) DRIVING CONTROLLER FOR A VEHICLE

(75) Inventor: Toshiro Matsuda, Sagamihara (JP)

(73) Assignee: Nissan Motor Co., Ltd., Yokohama, Kanagawa (JP)

( * ) Notice: Subject to any disclaimer, the term of this patent is extended or adjusted under 35 U.S.C. 154(b) by 542 days.

(21) Appl. No.: 11/402,723

(22) Filed: Apr. 12, 2006

(65) Prior Publication Data

US 2006/0235576 A1 Oct. 19, 2006

(30) Foreign Application Priority Data

Apr. 13, 2005 (JP) ............................. 2005-115931
Nov. 8, 2005 (JP) ............................. 2005-323701

(51) Int. Cl.
*H02P 5/41* (2006.01)
*G06F 19/00* (2006.01)

(52) U.S. Cl. ................ 701/1; 701/22; 701/69; 318/139

(58) Field of Classification Search ............ 701/1, 701/69, 22, 87, 90; 318/801, 432, 139, 727; 180/65.2

See application file for complete search history.

(56) References Cited

U.S. PATENT DOCUMENTS

| 7,279,855 | B2 * | 10/2007 | Tahara et al. ................. 318/46 |
| 7,383,902 | B2 * | 6/2008 | Matsuzaki et al. ......... 180/65.2 |
| 2001/0017225 | A1 | 8/2001 | Yamamoto et al. |
| 2001/0019210 | A1 * | 9/2001 | Fukasaku et al. .......... 290/40 C |
| 2003/0146726 | A1 | 8/2003 | Ishikawa et al. |
| 2004/0163860 | A1 | 8/2004 | Matsuzaki et al. |
| 2004/0207348 | A1 * | 10/2004 | Wilton et al. ............... 318/139 |
| 2004/0231897 | A1 | 11/2004 | Kimura et al. |

FOREIGN PATENT DOCUMENTS

| EP | 1 129 890 A2 | 9/2001 |
| EP | 1 526 027 A2 | 4/2005 |
| EP | 1 535 789 A1 | 6/2005 |
| EP | 1 674 327 A2 | 6/2006 |

* cited by examiner

*Primary Examiner*—Tan Q Nguyen
(74) *Attorney, Agent, or Firm*—Young Basile

(57) ABSTRACT

A type of driving controller for a vehicle that makes use of a combination of a generator and an AC motor to perform stable motor torque control. Target output electric power that should be output from the generator is computed on the basis of the motor's necessary electric power, and the generator is controlled at the operating point where the torque instruction value computed on the basis of the target output electric power can be generated at good efficiency. Also, the torque instruction value of the motor is computed on the basis of present output voltage and output current of the generator, and the motor is controlled on the basis of the torque instruction value.

30 Claims, 15 Drawing Sheets

DRIVING CONTROLLER FOR A VEHICLE

TECHNICAL FIELD

The invention pertains in general to a driving force controller for a vehicle, and more particularly to a driving force controller for a vehicle having first driving wheels and second driving wheels.

BACKGROUND

In a known driving controller for a vehicle such as that described in Japanese Kokai Patent Application No. 2001-239852, a second driving shaft is driven by a DC motor driven by the power of a generator. By controlling the field current of the DC motor, the driving torque is controlled.

BRIEF SUMMARY OF THE INVENTION

One aspect of the invention provides a type of driving force controller for a vehicle having first driving wheels and second driving wheels. The driving force controller can include, for example, an engine for driving the first driving wheels, a generator driven by the engine, an AC motor for receiving power generated by the generator and driving the second driving wheels, an inverter between the generator and the AC motor, means for computing a motor's necessary electric power needed for the AC motor and means for controlling the generator based on the motor's necessary electric power and the AC motor by controlling the inverter based on an output state of the generator.

Another example of a driving force controller for a vehicle having first driving wheels and second driving wheels comprises a engine for driving the first driving wheels, a generator driven by the engine, an AC motor for receiving power generated by the generator and driving the second driving wheels, an inverter between the generator and the AC motor, a motor's necessary electric power computing part operable to compute a motor's necessary electric power needed for the AC motor, a generation control part operable to control the generator on the basis of the motor's necessary electric power, and a motor control part operable to control the AC motor by controlling the inverter on the basis of an output state of the generator.

Another aspect disclosed herein is a method of controlling driving force for a vehicle having first driving wheels and second driving wheels. The method comprises, for example, driving the first driving wheels using a engine, driving a generator using the engine, driving the second driving wheels using an AC motor receiving power generated by the generator, computing a motor's necessary electric power needed for the AC motor, controlling the generator based on the motor's necessary electric power and controlling the AC motor based on an output state of the generator.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

For the known driving controller, because a direct current motor (DC motor) is used to control the motor torque, in order to increase the torque it is necessary to increase the armature current of the DC motor. However, since the service life of the brushes of the DC motor is limited an increase in the armature current is limited, and it is difficult to use the DC motor on a heavy vehicle and to improve the 4WD performance.

The purpose of embodiments disclosed herein is to solve these problems by providing a type of driving force controller for a vehicle characterized by the fact that instead of the DC motor, an alternating current motor (AC motor) is used to control the driving force of the vehicle.

In order to realize this purpose, a type of driving force controller for a vehicle is provided that contains an engine, a generator, a sensor, an AC motor, an inverter, a motor's necessary electric power computing part, a field control means and a motor control means. Together with the first driving wheels, the engine drives a generator having a field coil. The output state of the generator driven by the engine is detected by the sensor. As the electric power generated by the generator is fed to it, the AC motor drives the second driving wheels. The inverter is set between the generator and the AC motor. The motor's necessary electric power computing part computes the necessary electric power needed for the AC motor. On the basis of this computed electric power, the field control means controls the field of the generator generated by the field coil. The motor control means controls the AC motor by controlling the inverter on the basis of the detected output state of the generator.

Accordingly, the AC motor is controlled on the basis of the output state of the generator. Consequently, it is possible to perform driving force control. Details of various aspects are best shown by reference to the figures.

Figure 1:
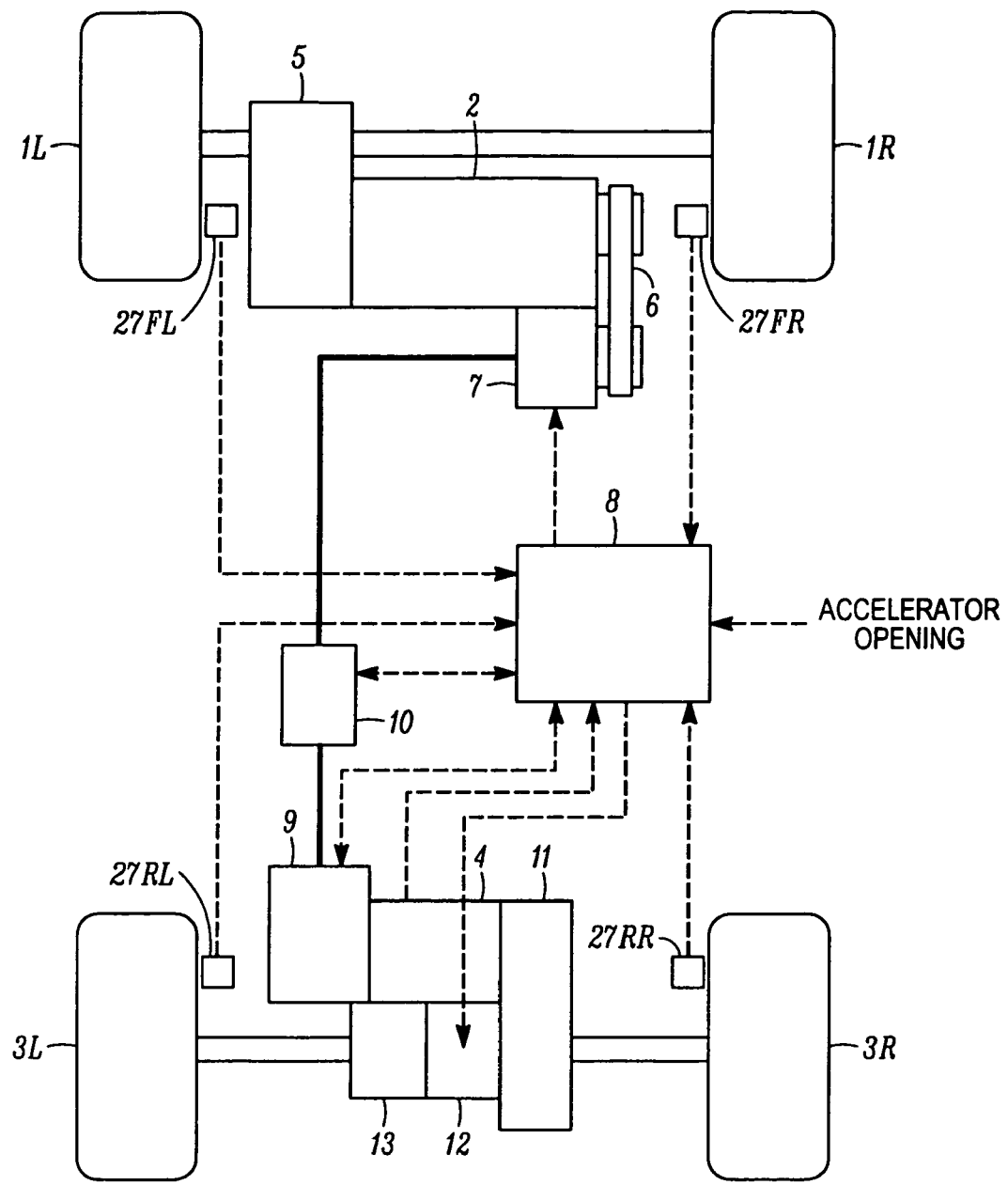
FIG. 1 is a schematic diagram illustrating an automobile incorporating an embodiment of the present invention.

FIG. 1 is a schematic diagram illustrating a four-wheel drive (4WD) vehicle incorporating an embodiment of the present invention. In the vehicle shown in FIG. 1, left and right front wheels 1L, 1R are first driving wheels driven by engine 2, such as an internal combustion engine, and left and right rear wheels 3L, 3R are second driving wheels driven by motor 4.

On the intake pipeline of engine 2, for example, a main throttle valve and a sub-throttle valve are set. The main throttle valve adjusts the throttle opening corresponding to the step-in stroke of the accelerator pedal or the like, and it adjusts and controls the openness by the rotating angle corresponding to the step-in stroke. On the other hand, by adjusting the throttle openness of the sub-throttle valve to less than the openness of the main throttle valve, it is possible to reduce the output torque of the engine independent from the operation of the driver in stepping down the accelerator pedal. That is, adjustment of the sub-throttle valve opening becomes the control of the driving force that suppresses the acceleration slip of left and right front wheels 1L, 1R by engine 2.

Output torque Te of engine 2 is transmitted via the transmission and difference gear 5 to left and right-front wheels 1L, 1R. A portion of output torque Te of engine 2 is transmitted via endless belt 6 to generator 7, so that generator 7 is rotated at rotation velocity Ng equal to rotation velocity Ne of engine 2 times the pulley ratio.

Generator 7 becomes a load with respect to engine 2 corresponding to field current Ifg adjusted by 4WD controller 8, and electric power is generated corresponding to this load torque. The magnitude of the electric power generated by generator 7 depends on the magnitudes of rotation velocity Ng and field current Ifg. Also, rotation velocity Ng of generator 7 can be computed from rotation velocity Ne of engine 2 on the basis of the pulley ratio.

Figure 2:
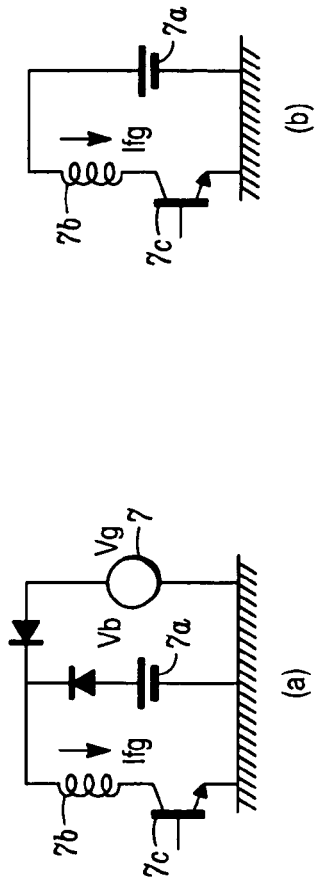
FIG. 2 includes diagrams illustrating a field current driver for the generator according to FIG. 1.

FIG. 2 includes diagrams illustrating examples of a field current driver of generator 7. As shown in circuit (a), the field current driver allows selection of the field current power source between the constant voltage power source, such as the 14-volt battery 7a of the vehicle and the output voltage Vg of the generator 7. The circuit (a) has the plus side of the field current power source connected to field coil 7b, and transistor 7c is switched in this structure. In this example, when the output voltage Vg of the generator 7 becomes lower than battery voltage Vb, generator 7 enters the external excitation region, and battery voltage Vb becomes the power source of field coil 7b. On the other hand, when the output of the generator 7 rises, and output voltage Vg becomes higher than battery voltage Vb, generator 7 enters the self-excitation region. Output voltage Vg of the generator 7 is selected as the power source of field coil 7b. That is, the field current level can be raised by the power source voltage of the generator 7, so that the output of the generator 7 can be increased significantly.

Also, as shown in circuit (b), 14-volt battery 7a of the vehicle may be used alone as the field current power source for the field current driver (only in the external excitation region).

Returning now to FIG. 1, the electric power generated by generator 7 can be fed via junction box 10 and inverter 9 to motor 4. The drive shaft of motor 4 can be connected via reducing gear 11 and clutch 12 to left and right rear wheels 3L, 3R. Also, motor 4 in this embodiment is an AC motor, and part number 13 in FIG. 1 represents a difference gear.

Figure 28:
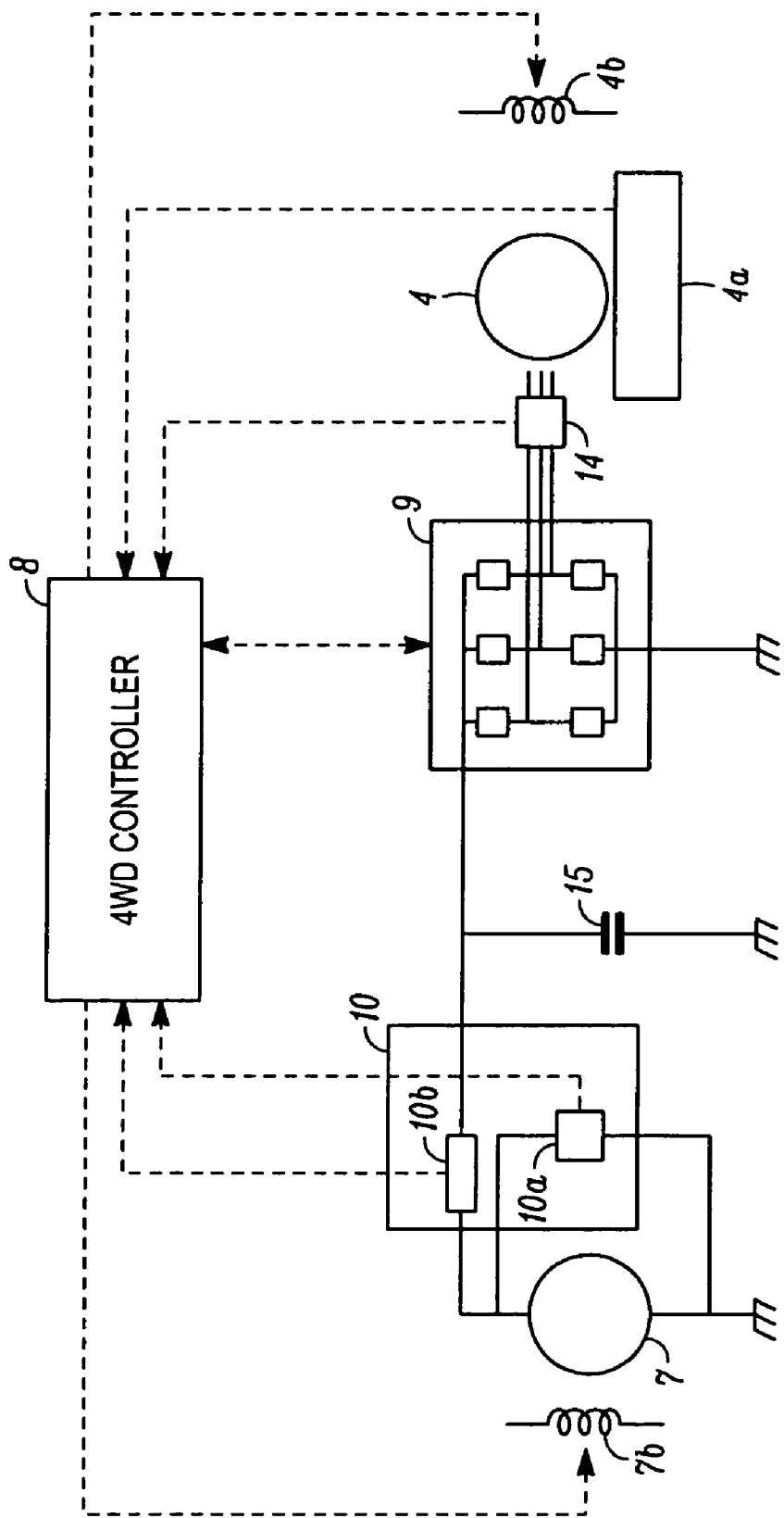
FIG. 28 is a schematic diagram further illustrating the generator, inverter and motor of FIG. 1.

In junction box 10, a relay is set for connecting and cutting off inverter 9 and generator 7. While that relay is connected, the DC power fed from generator 7 via the rectifier (not shown) is converted by inverter 9 to 3-phase AC power that drives motor 4. Also, as shown in FIG. 28 three-phase AC current sensor 14 for detecting the three-phase AC current as the output current of inverter 9 is set between inverter 9 and motor 4. The detection signal of the three-phase AC current sensor 14 is output to 4WD controller 8.

In FIG. 28, a generator's voltage sensor 10a for detecting the generated voltage and a generator's current sensor 10b that detects the generated current as the input current to inverter 9 are also set in junction box 10. Their detected signals are output to 4WD controller 8. Also, a capacitor 15 is set between generator's current sensor 10b and inverter 9. A resolver 4a is connected to the drive shaft of motor 4, and it outputs the pole position signal θ of motor 4. In addition, motor 4 has motor's field coil 4b.

Reference is again made to FIG. 1. By example, clutch 12 may be a wet-type multi-plate clutch that is engaged/released corresponding to the instruction from 4WD controller 8. In this embodiment, a wet-type multi-plate clutch is used as the clutch, that is, the engaging means. However, one may also make use of other types, such as a powder clutch, pump type clutch, etc.

Wheel velocity sensors 27FL, 27FR, 27RL, 27RR are set on wheels 1L, 1R, 3L, 3R, respectively. These wheel velocity sensors 27FL, 27FR, 27RL, 27RR output pulse signals corresponding to the rotation velocities of respective wheels 1L, 1R, 3L, 3R in a known manner as the wheel velocity detection values to 4WD controller 8.

The 4WD controller 8, for example, has a microcomputer or other arithmetic operation processor that has the following signals input: wheel velocity signals detected with wheel velocity sensors 27FL, 27FR, 27RL, 27RR, output signals of the generator's voltage sensor 10a and generator's current sensor 10b in junction box 10, the output signal of the resolver 4a connected to motor 4 and the accelerator opening corresponding to the step-in stroke of the accelerator pedal (not shown). The 4WD controller 8 includes subroutines, or parts, stored in memory that can be performed by the 4WD controller 8.

Figure 3:
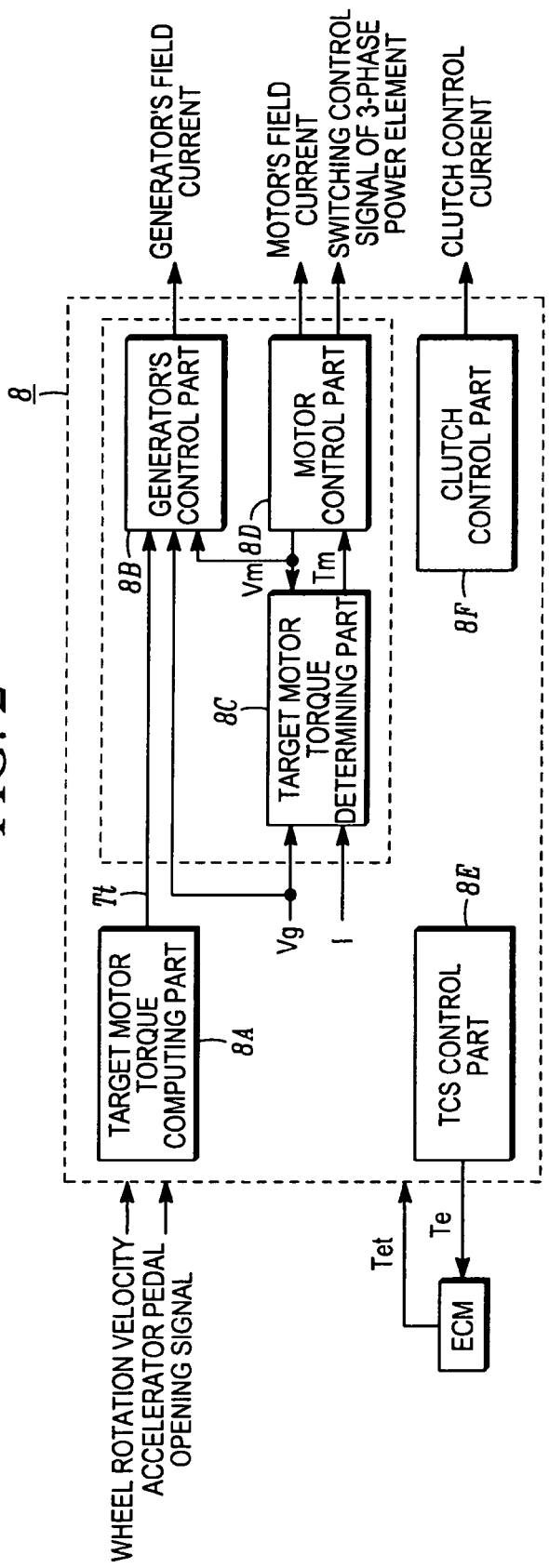
FIG. 3 is a block diagram illustrating a controller according to FIG. 1.

As shown in FIG. 3, 4WD controller 8 has the following parts: target motor torque computing part 8A, generator's control part 8B as the field control means, target motor torque determining part 8C, motor control part 8D, TCS control part 8E and clutch control part 8F. Target motor torque determining part 8C and motor control part 8D form the motor control means.

Target motor torque computing part 8A computes first motor torque instruction value Tt from the difference in wheel velocity between the front and rear wheels computed on the basis of the wheel velocity signals of the four wheels and the accelerator pedal openness signal.

Figure 4:
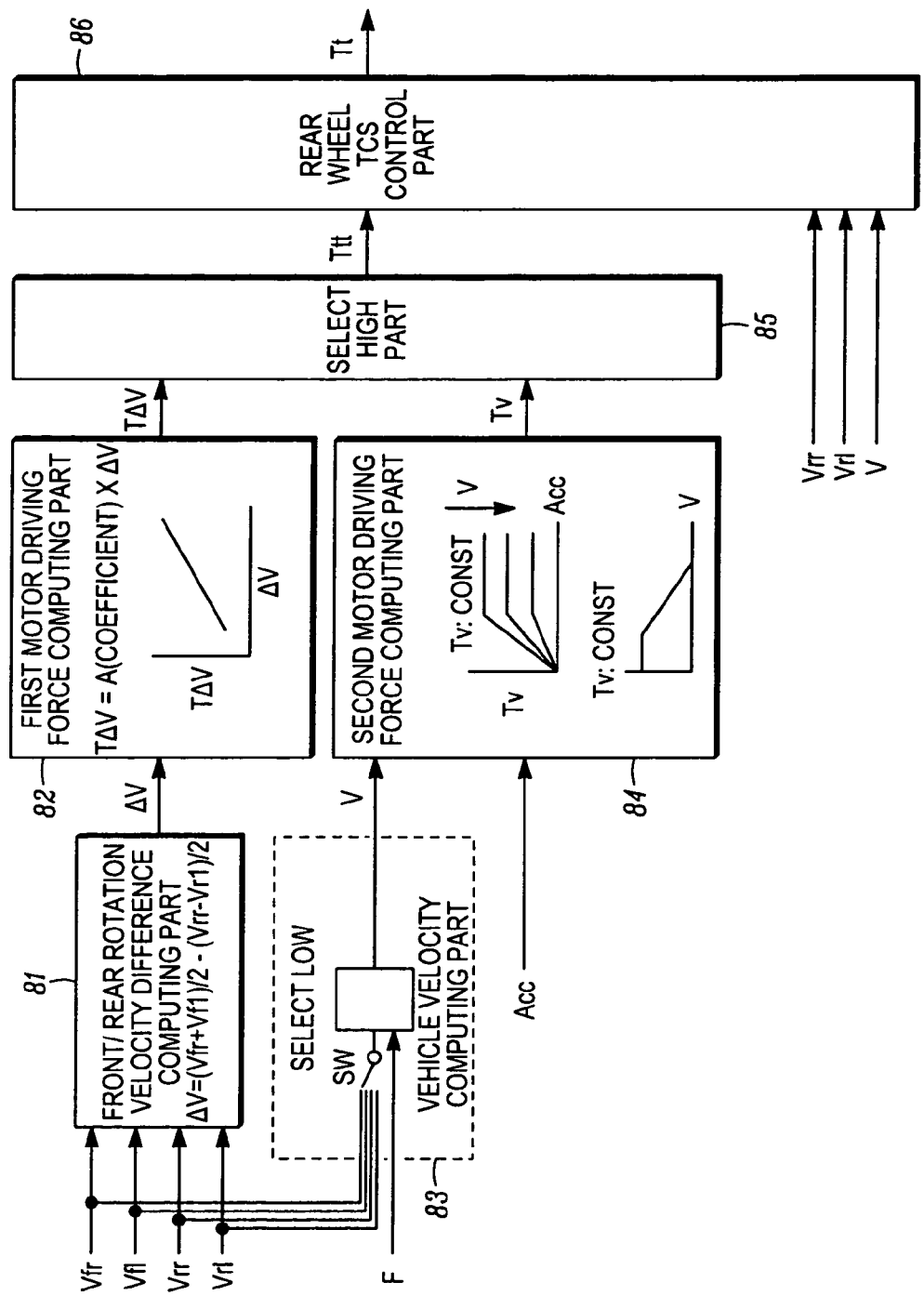
FIG. 4 is a block diagram illustrating a target motor torque computing part shown in FIG. 3.

FIG. 4 is a block diagram illustrating the target motor torque computing part 8A in additional detail. First, front/rear rotation velocity difference computing part 81 computes front/rear wheel rotation velocity difference ΔV on the basis of the four wheels' wheel velocity signals Vfr, Vfl, Vrr, Vrl as indicated in formula (1) below.

$$\Delta V = (Vfr + Vfl)/2 - (Vrr - Vrl)/2 \quad (1)$$

Then, with reference to the map pre-stored in first motor driving force computing part 82 and on the basis of front/rear wheel rotation velocity difference ΔV, first motor driving force TΔV is computed and output to the select high part 85 to be explained later. First motor driving force TΔV is set such that it proportionally rises as front/rear wheel rotation velocity difference ΔV becomes larger.

Vehicle velocity computing part 83 computes vehicle velocity signal V while taking the four wheels' wheel velocity signal and total driving force F generated by the vehicle as select low. Here, total driving force F is determined as the sum of the front wheel driving force estimated from the torque converter slip ratio and the rear wheel driving force estimated from first motor torque instruction value Tt.

Second motor driving force computing part 84 computes second motor driving force Tv. More specifically, it is computed on the basis of vehicle velocity V output from vehicle velocity computing part 83 and accelerator opening Acc, and with reference to the pre-stored map. Second motor driving force Tv is set such that it is larger when accelerator opening Acc is larger, and it becomes smaller as vehicle velocity V becomes lower.

Then, select high part 85 outputs first motor driving force TΔV output from first motor driving force computing part 82 and second motor driving force Tv output from second motor driving force computing part 84 to rear wheel TCS control part 86, with the select high value taken as target torque Ttt.

On the basis of rear wheel velocities Vrl, Vrr and vehicle velocity V, rear wheel traction control is performed using the conventional method, and torque instruction value Tt of motor 4 is output.

Figure 5:
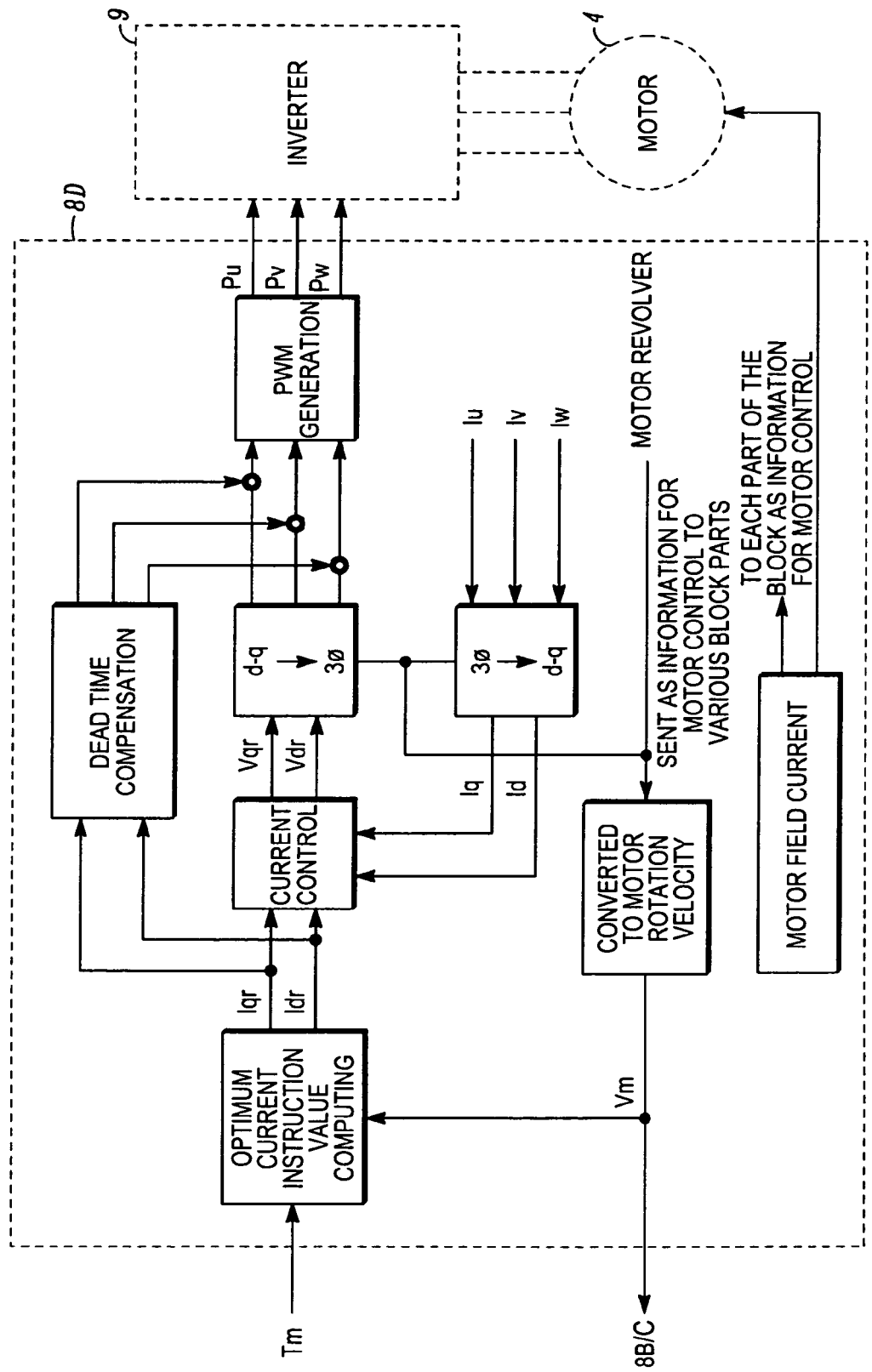
FIG. 5 is a block diagram illustrating a motor control part shown in FIG. 3.

Motor control part 8D performs conventional vector control as shown in FIG. 5 from torque instruction value Tt as well as torque rotational value Tm and motor rotating velocity Vm output from the target motor torque determining part 8C, to be described in more detail hereinbelow. Then, the switching control signal of the 3-phase power element is output to inverter 9 to control the 3-phase AC current.

Returning now to FIG. 3, TCS control part 8E makes use of the conventional method to perform front wheel traction control by returning engine's output torque Te on the basis of engine generation driving torque demand signal Tet from engine torque control controller (ECM), front wheel rotation speeds Vfr, Vfl, and vehicle speed V.

Clutch control part 8F controls the state of clutch 12, and clutch 12 is controlled to the connected state while the state is judged to be the 4WD state.

Figure 6:
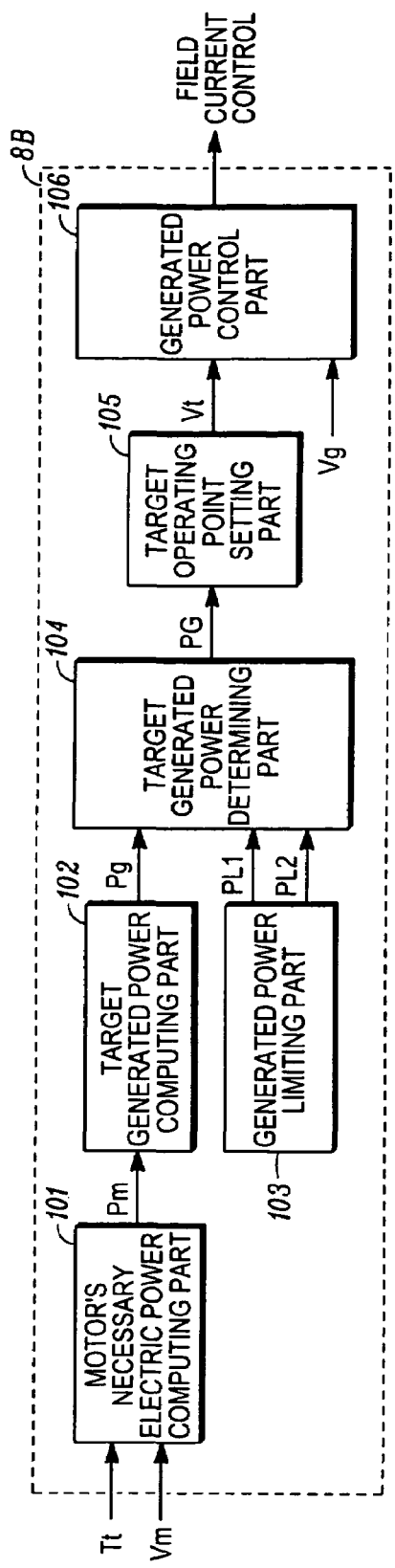
FIG. 6 is a block diagram illustrating a generator's control part shown in FIG. 3.

FIG. 6 is a block diagram illustrating in additional part generator's control part 8B that performs power generation control of generator 7. Generator's control part 8B is composed of motor's necessary electric power computing part 101, target generated power computing part 102, generated power limiting part 103, target generated power determining part 104, target operating point setting part 105 and generated power control part 106. Generator's control part 8B controls field current Ifg of generator 7.

Motor's necessary electric power computing part 101 uses the following formula (2) to compute electric power Pm required for motor 4 on the basis of first motor torque instruction value Tt computed by target motor torque computing part 8A and motor rotating velocity Vm.

$$Pm = Tt \times Vm \quad (2)$$

Target generated power computing part 102 uses the following formula (3) to compute generator's necessary electric power Pg to be output by generator 7 on the basis of motor's necessary electric power Pm output from motor's necessary electric power computing part 101.

$$Pg = Pm / \eta m \quad (3)$$

Here, ηm represents the motor efficiency. That is, generator's necessary electric power Pg has to be output higher by a ratio corresponding to the motor efficiency than motor's necessary electric power Pm.

Generated power limiting part 103 outputs limiting values PL1 and PL2 of the generated power. Electric power limiting value PL1 is the upper limit value to ensure that the power generated by generator 7 does not exceed the electric power determined corresponding to the driving belt's 6 transmittable torque, and it is computed with the following formula (4):

$$PL1 = Tb \times \omega g \times \eta g \quad (4)$$

Here, Tb represents the belt's transmittable torque; ωg represents the rotation velocity of generator 7; ηg represents the efficiency of the generator; and PL1 represents the maximum electric power that can be generated by generator 7 corresponding to the state when the belt's transmittable torque is Tb.

Figure 7:
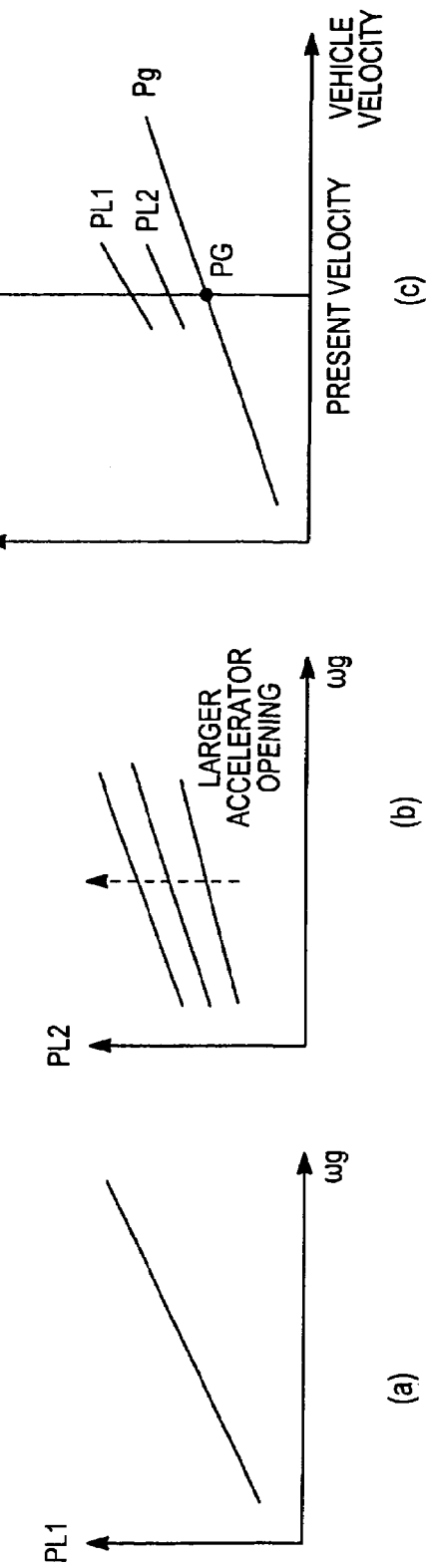
FIG. 7 includes graphs illustrating the relationship between the electric power limiting value and the target output electric power.

Then, as shown in graph (a) of FIG. 7, electric power limiting value PL1 is computed, and it is proportionally larger as rotation velocity ωg of generator 7 becomes higher.

On the other hand, electric power limiting value PL2 represents the upper value of the generated power when engine stall or degradation in operability may take place as the load on the engine becomes excessive. This limiting value PL2 is given from engine torque controller (ECM). As shown in graph (b) of FIG. 7, electric power limiting value PL2 is computed, and it is larger when rotation velocity log of generator 7 is higher or when accelerator opening Acc is larger.

The computing results of target generated power computing part 102 and generated power limiting part 103 are input to target generated power determining part 104, generator's necessary electric power Pg and limiting values PL1 and PL2 are set as select low, and target output electric power PG of the generator is computed.

Graph (c) of FIG. 7 illustrates the case when the generator's necessary electric power Pg is the lowest among generator's necessary electric power Pg and limiting values PL1 and PL2. In this case, generator's necessary electric power Pg at the present velocity is selected as target output electric power PG.

Figure 8:
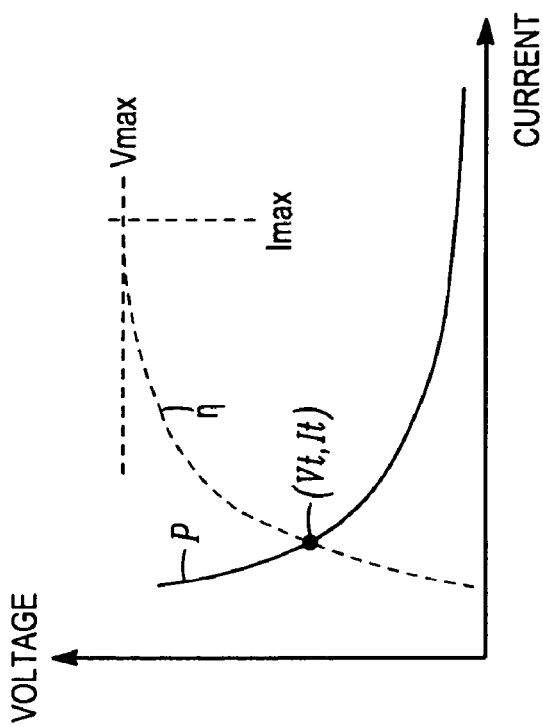
FIG. 8 is a graph illustrating a method for selecting the target operating point.

Then, in target operating point setting part 105, target output electric power PG output from target generated power determining part 104, that is, the motor's usable electric power, is determined by determining the input voltage and input current of inverter 9 that allows high-efficiency generation, that is, target voltage Vt and target current It of generator 7. More specifically, as shown in FIG. 8, the intersection between constant electric power line P corresponding to motor's usable electric power PG and maximum efficiency operating point line η indicated as a broken line is selected as the target operating point (Vt, It) of generator 7.

Usually, the efficiency of the generator 7 is higher for higher voltage and lower current, and the motor's efficiency has no significant change except when the current is low. Consequently, it is preferred that the operation be performed at high voltage and low current because that corresponds to good overall efficiency as a combination of the efficiency of the generator 7 and the efficiency of the motor 4. Also, for the system there are the upper limit voltage Vmax (such as 60 V) and upper limit current Imax (it can be determined by the specifications of the inverter element and in design of the generator and motor, and it may be, e.g., 30 A). Consequently, when the operating point is selected such that as the voltage approaches upper limit voltage Vmax, the voltage is nearly constant or increases only slightly, while the current increases. Finally, the current rises to reach upper limit current Imax. The line that connects the operating points is the maximum efficiency operating point line η, and this maximum efficiency operating point line η is stored beforehand.

Returning now to FIG. 6, target voltage Vt determined in this way is input to generated power control part 106, and field current Ifg is controlled by generated power control part 106 such that output voltage Vg of generator 7 becomes target voltage Vt.

Target operating point setting part 105 corresponds to the target operating point setting means, and generated power control part 106 corresponds to the generator's output control means.

Figure 9:
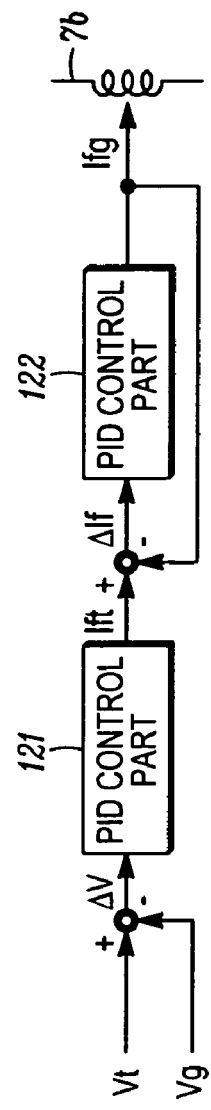
FIG. 9 is a block diagram illustrating a generated power control part according to a first embodiment.

FIG. 9 is a block diagram illustrating generated power control part 106 in a first embodiment. In generated power control part 106, the generator's field current value is fed back while the actual generator's field current Ifg is monitored such that the difference between target voltage Vt and output voltage Vg becomes zero.

First, difference ΔV between output voltage Vg from the generator's voltage sensor 10a and target voltage Vt is input to PID control part 121, and PID control part 121 outputs target field current Ift such that difference ΔV becomes zero.

In the present embodiment the field current detecting means, a field current sensor, is set to detect the actual generator's field current Ifg. Then, difference ΔIf between actual field current Ifg detected by the field current sensor and target field current Ift is determined, and it is output to PID control part 122. PID control part 122 controls actual field current Ifg such that difference ΔIf becomes zero.

As a result, output voltage Vg of generator 7 agrees with target voltage Vt. That is, the present operating point determined by output voltage Vg and output current I of generator 7 agrees with the target output point. Generator 7 can work at the operating point where target output electric power PG that should be output from generator 7 as computed from electric power Pm needed for motor 4 can be generated at high efficiency.

Figure 10:
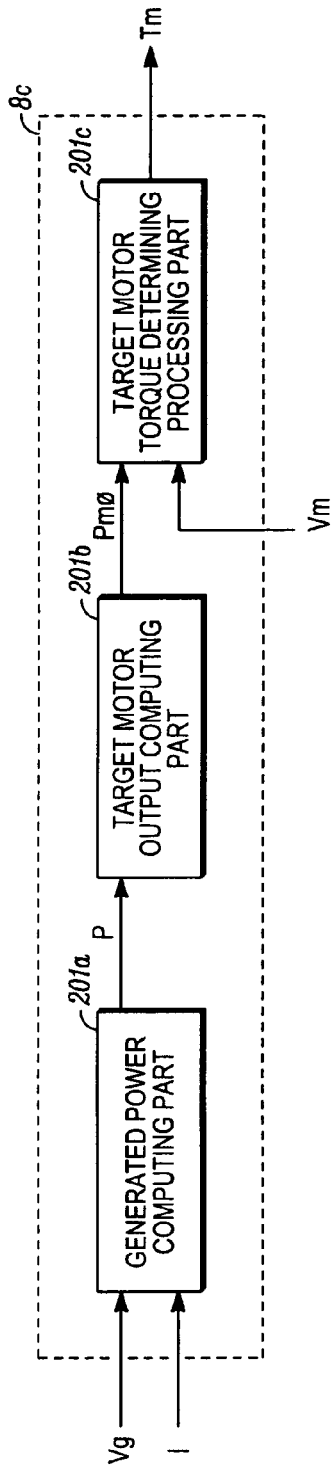
FIG. 10 is a block diagram illustrating the target motor torque determining part shown in FIG. 3.

FIG. 10 is a block diagram illustrating in additional detail target motor torque determining part 8C shown in FIG. 3. Target motor torque determining part 8C is composed of generated power computing part 201a as the output electric power computing means, target motor output computing part 201b and target motor torque determining processing part 201c. Target motor torque determining part 8C computes torque instruction value Tm of motor 4 from output voltage Vg and output current I of generator 7.

Generated power computing part 201a makes use of the following formula (5) to compute the present output electric power P on the basis of the present output voltage Vg and output current I of generator 7.

$$P = V_g \times I \quad (5)$$

Next, target motor output computing part 201b uses the following formula (6) to compute target motor output Pm0 on the basis of the present output electric power P computed by generated power computing part 201a and motor efficiency $\eta m$.

$$Pm0 = P \times \eta m \quad (6)$$

Target motor torque determining processing part 201c makes use of the following formula (7) to compute second motor torque instruction value Tm on the basis of target motor output Pm0 computed with target motor output computing part 201b and motor rotating velocity Vm.

$$Tm = Pm0 / Vm \quad (7)$$

That is, second motor torque instruction value Tm is the motor's torque corresponding to the current operating point (voltage, current) of the output of the motor, or, in other words, the driving force obtained when output power P at the current operating point of the generator is fed to motor 4.

As can be seen from FIG. 8, and as explained above, the output of generator 7 can be controlled to the target at the operating point (Vt, It) of the intersection between constant electric power line P corresponding to motor's usable electric power PG (target output electric power) and maximum efficiency operating point line η. Therefore, the output voltage Vg and output current I of generator 7 become the operation point near the maximum efficiency operation point line η.

Consequently, by computing second motor torque instruction value Tm on the basis of output voltage Vg and output current I of generator 7 and performing motor control with second motor torque instruction value Tm, motor control is performed such that while the present state of generator 7 is monitored, the torque that can be output is obtained. As a result, it is possible to maintain the present operation at the operating point with a high efficiency free of fluctuation in the operating point.

It is well known that usually the control response property of a generator is low, while the response property of motor control by means of an inverter is high. When the generator and the inverter are combined in a known device, for example, a rise in the output of the generator is slow in the process of rapid increase of the torque instruction, and motor control is performed such that the torque instruction is output while the input of the inverter is insufficient. Consequently, the generator is used at an operating point with a poor electric efficiency of low voltage and high current.

On the other hand, in the present embodiment output voltage Vg and output current I of generator 7 are monitored, and motor 4 is driven at the torque instruction value corresponding to the operating point at the time. As a result, it is possible to prevent the state in which generator 7 cannot output the electric power corresponding to the torque instruction value, it is possible to prevent divergence of the control system, and it is possible to prevent an operating point at a poor efficiency.

Figure 11:
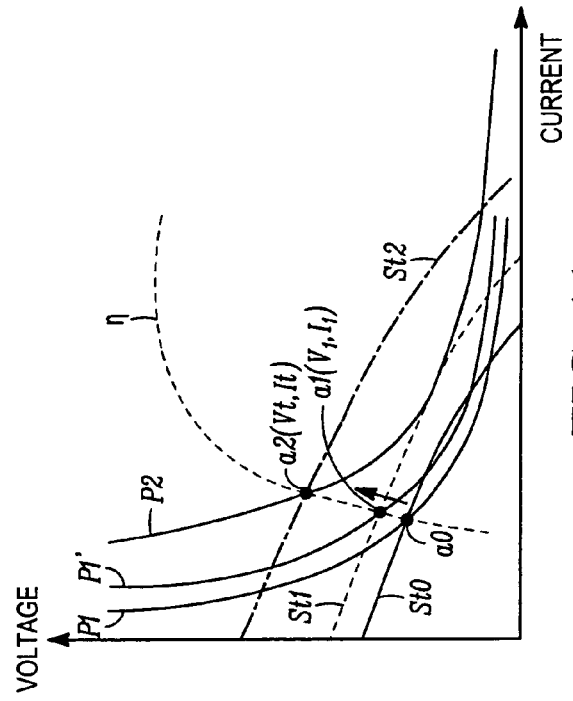
FIG. 11 includes graphs illustrating the operation according to an embodiment disclosed herein.
Figure 12:
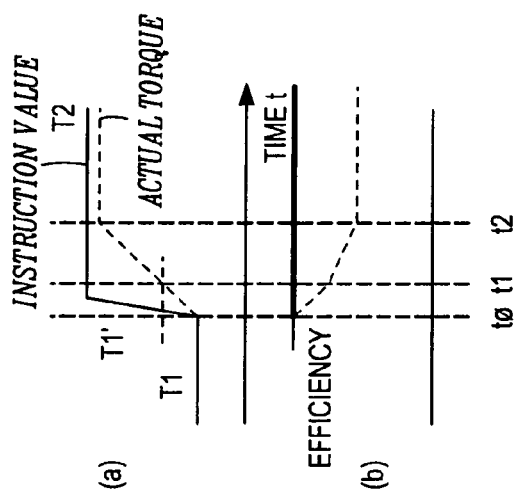
FIG. 12 includes additional graphs illustrating the operation according to the embodiment of FIG. 11.

That is, as shown in FIGS. 11 and 12, when the operating point of the generator 7 is at point a0 on output possible characteristic line St0, at time t0, it increases from torque instruction value T1 to torque instruction value T2. In this case, in generator's control part 8B, control is performed to increase field current Ifg such that the operating point of the generator 7 becomes the target output point (Vt, It). Then, at time t1, the output possible characteristic line becomes St1. Suppose at this time, the operating point is at point a1 ($V_1$, $I_1$) on output possible characteristic line St1. As shown in FIG. 10, target motor torque determining part 8C makes use of formulas (5)-(7) to compute second motor torque instruction value Tm (=T1'<T2) on the basis of output voltage $V_1$ and output current $I_1$ of generator 7, and motor 4 is controlled by second motor torque instruction value Tm.

Because the constant power line corresponding to second motor torque instruction value Tm (=T1') computed in this way is P1', the operating point of the generator 7 at time t1 becomes the state in which the operating point of the generator 7 at time t1 is kept at operating point a1 ($V_1$, $I_1$) at the intersection between output possible characteristic line St1 and constant power line P1'.

After that, control is performed at the various times until the output possible characteristic line becomes St2. As a result, the operating point of the generator 7 can move on maximum efficiency operating point line η to target operating point a2 (Vt, It) without falling to the poor-efficiency operating point as would take place in the conventional operation.

At time t2, it becomes output possible characteristic line St2. Suppose at this time, the operating point is target operating point a2 (Vt, It) on output possible characteristic line St2. Motor 4 is controlled by second motor torque instruction value Tm (=T2) computed on the basis of output voltage Vt and output current It using formulas (5)-(7).

Consequently, because second motor torque instruction value Tm is increased together with a rise in the actual electric power of generator 7 as shown by the broken line in graph (a) of FIG. 12, compared with a known operation, the time until the actual driving force reaches torque instruction value T2 becomes longer. Yet, as shown in graph (b) of FIG. 12, it is possible to operate at the operating point with a high efficiency all the time.

As explained above in the first embodiment, from the electric power required by the motor, the field current of the generator is controlled, and the motor is controlled by the output voltage and output current of the generator. As a result, because the instruction value to the generator and the instruction value to the motor are different, even for a combination of the control of the generator with a low response property and the control of the generator with a high response property, it is still possible to suppress divergence of the control system or operation at a very poor efficiency.

Also, because control is performed to the target operating point with the optimum efficiency for the output of the generator itself, the operating point approaches the operating point at which the present output voltage and output current of the generator are at a maximum efficiency. The motor is controlled by the torque instruction value corresponding to the present output electric power computed from the present output voltage and output current. Consequently, it is possible to maintain control at the operating point with good efficiency.

From the present output voltage and output current of the generator, the actual output electric power is computed, and the motor efficiency is multiplied by the actual output electric power. By dividing the motor's rotation velocity, the torque instruction value for performing the motor control is computed. Consequently, the driving force obtained when the actual output electric power is fed to the motor with high reliability can be set as the torque setting value.

In addition, the field current of the generator is monitored, and feedback control is performed such that the actual field current tracks the target field current. Consequently, it is possible to have the output voltage track the target voltage with high reliability.

Figure 13:
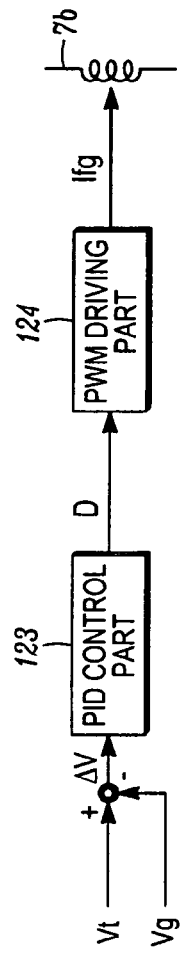
FIG. 13 is a block diagram illustrating another example of the generated power control part according to the first embodiment.

In the first embodiment, the case when target field current Ift is tracked while monitoring actual field current Ifg of generator 7 with generated power control part 106 was explained. The present invention, however, is not limited to this scheme. As shown in FIG. 13, one may also adopt a scheme in which the generator's field current PWM is controlled such that the difference between target voltage Vt and output voltage Vg becomes zero. In this case, first of all, difference ΔV between target voltage Vt and output voltage Vg is output to PID control part 123.

PID control part 123 controls pulse width modulated (PWM) duty ratio D of the field current driver of generator 7 corresponding to difference ΔV. More specifically, when Vt>Vg PWM duty ratio D is increased, and when Vt<Vg PWM duty ratio D is decreased. For example, PID control is performed as follows in formula (8).

$$D = \alpha \times (Vt - Vg) + \beta \times \int (Vt - Vg) \quad (8)$$

Figure 14:
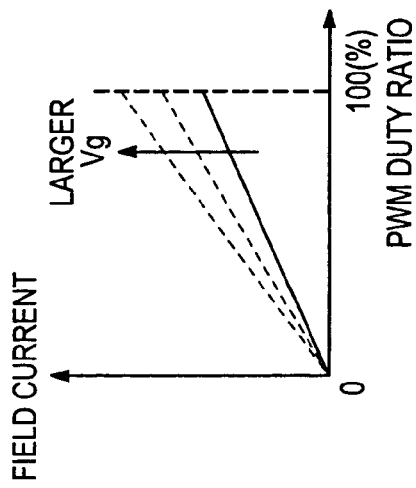
FIG. 14 is a graph illustrating the characteristics of the relationship between duty ratio and field current.

FIG. 14 is a graph illustrating the characteristics of the relationship between PWM duty ratio D and field current Ifg according to FIG. 13. In this graph, the abscissa represents PWM duty ratio D, and the ordinate represents field current Ifg. As can be seen from these characteristics, when duty ratio D is 0% field current Ifg does not flow, and as duty ratio D approaches 100% high field current Ifg flows.

According these characteristics, as field power source voltage Vf rises the slope becomes larger, and as the resistance of the field coil becomes smaller the slope becomes larger. When generator's output voltage Vg is equal to battery voltage Vb or lower it is represented as Ifg=a×D, and when Vg>Vb it is represented as Ifg=a×Vf×D. Here, a is a constant.

Here, as PWM duty ratio D output as described above is controlled by PWM driving part 124, it is possible to control field current Ifg. As a result, it is possible to perform control such that output voltage Vg of generator 7 becomes target voltage Vt.

As a result, it is possible to contain the entirety of the error factors of the field current control due to variation in the voltage of the field current and variation in the resistance of the field coil, etc., and to perform control with a large loop of the output voltage and the target voltage. Consequently, there is no need to set a field current sensor, and it is possible to reduce the cost.

In the example shown in FIG. 13, the treatment of PID control part 123 and PWM driving part 124 corresponds to the duty ratio control means.

Figure 15:
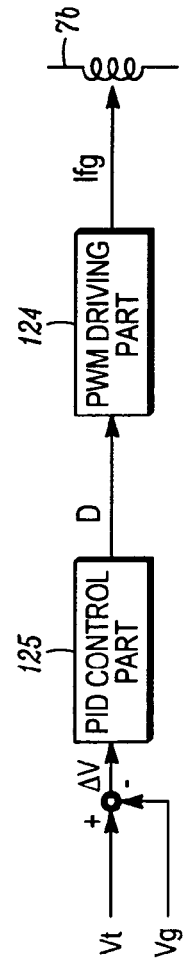
FIG. 15 is a block diagram illustrating another example of the generated power control part according to the first embodiment.

As shown in FIG. 15, one may also adopt a scheme in which generated power control part 106 is used to perform feedback control of the product of field power source voltage Vf and PWM duty ratio D. In this case, difference ΔV between output voltage Vg and target voltage Vt is input to PID control part 125, and PID control shown in following formula (9) is performed to output PWM duty ratio D.

$$Vf \times D = \alpha \times (Vt - Vg) + \beta \times \int (Vt - Vg); \text{ so}$$

$$D = \{\alpha \times (Vt - Vg) + \beta \times \int (Vt - Vg)\} / Vf \quad (9)$$

As explained above, when Vg>Vb one has field current Ifg=α×Vf×D. With this relationship, it is possible to use Vf×D as field current Ifg in performing feedback control. That is, by means of feedback control of the product of field power source voltage Vf and PWM duty ratio D, it is possible to realize the control effect such that field current Ifg is substantially subjected to feedback control. Also, in the region with high field power source voltage Vf, it is possible to set the weight of PWM duty ratio to be smaller than that when the voltage is low. Consequently, it is possible to perform appropriate control in consideration of the magnitude of the field power source voltage.

In the second embodiment, in target motor torque determining part 8C from the relationship between the generator's output value and the generator's target value, it is possible to compute the torque instruction value of the motor.

Figure 16:
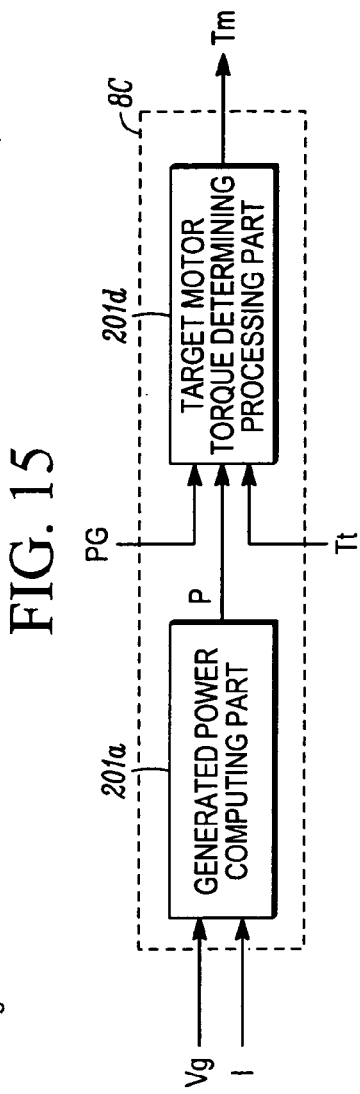
FIG. 16 is a block diagram illustrating the target motor torque determining part shown in FIG. 3 in a second embodiment.

Except for the following, the makeup of the target motor torque determining part 8C in the second embodiment is the same as that of the first embodiment, so common features with the first embodiment will not be explained in detail again. As shown in FIG. 16, in target motor torque determining part 8C shown in FIG. 10 in the first embodiment, target motor output computing part 201b and target motor torque determining processing part 201c are replaced by target motor torque determining processing part 201 d that computes torque instruction value Tm from the relationship between actual output electric power P as the generator's output value and target output electric power PG as the target value of the generator 7.

Target motor torque determining processing part 201d computes second motor torque instruction value Tm from ratio P/PG, that is, the ratio of actual output electric power P to target output electric power PG where P is the actual output power computed by generated power computing part 201a, and PG is the target output power output from target generated power determining part 104 of generator's control part 8B. That is, second motor torque instruction value Tm is computed using following formula (10) from the relationship of P/PG=Tm/Tt.

$$Tm = Tt \times P/PG \quad (10)$$

This relationship reflects that the ratio P/PG of actual output electric power P to target output electric power PG is equal to the ratio of Tm/Tt of the second motor torque instruction value Tm that should be output at present to the first torque instruction value Tt to target power PG. Here, first motor torque instruction value Tt corresponds to the required driving force of motor 4, and it is determined as described previously.

Figure 17:
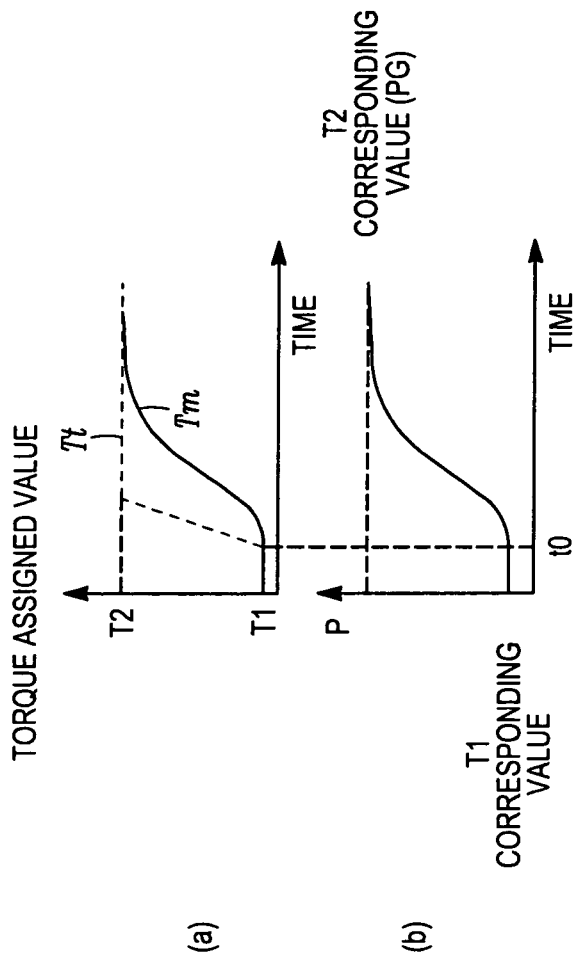
FIG. 17 includes graphs illustrating the relationship between the output electric power of the generator and the motor torque instruction value.

FIG. 17 includes graphs illustrating the relationship between actual output electric power P of generator 7 and second motor torque instruction value Tm. As indicated by the broken line in graph (a) of FIG. 17, at time t0 first motor torque instruction value Tt rises from T1 to T2. In this case, in generator 7 field current Ifg is controlled to increase such that torque instruction value T2 can be generated in motor 4. (It is possible to output to target output electric power PG corresponding to torque instruction value T2). As explained above, because the control response property of generator 7 is low, current Ifg does not quickly rise to the target value. Instead, as shown in graph (b) of FIG. 17, output electric power P of generator 7 is delayed, and it slowly rises to target output electric power PG.

In this embodiment, on the basis of the relationship of P/PG=Tm/Tt as shown in formula (10), second motor torque instruction value Tm is computed by multiplying ratio P/PG of actual output electric power P to target output electric power PG by first motor torque instruction value Tt as the target. Consequently, as indicated by the solid line in graph (a), second motor torque instruction value Tm slowly rises to first motor torque instruction value Tt (=T2) as the target accompanying the rise of the actual electric power of generator 7.

That is, in the present embodiment, as in the first embodiment as shown in graph (a) of FIG. 12, the operating point of the generator 7 moves along maximum efficiency operating point line η from operating point a0 to operating point a2, and the operation at the operating point with a good efficiency can be maintained all the time.

In this way, in the second embodiment the second motor torque instruction value Tm of the motor 4 is computed on the basis of the relationship with the ratio of the present output electric power of the generator 7 to the target output electric power PG. Consequently, it is possible to have second motor torque instruction value Tm slowly rise along with the rise in the actual electric power P of the generator 7. As in the first embodiment, it is possible to output the second motor torque instruction value Tm that can be output in the present state of the generator 7, and it is possible to perform motor control at the operating point with good efficiency.

In the second embodiment, the case when second motor torque instruction value Tm is determined corresponding to output electric power P of generator 7 was explained. Again, the present invention is not limited to this scheme. When the output power of generator 7 is highly correlated to the output voltage and output current, instead of output electric power P, one may use output voltage Vg or output current I of generator 7 as well. That is, one may also use output voltage Vg or output current I as the output value of the generator, and use target voltage Vt or target current It as the target value of the generator. Such high correlation can exist when, for example, the input impedance to the inverter/motor is constant. In this case, the electric power is proportional to both the voltage and current. When high correlation exists, second motor torque instruction value Tm may be computed by multiplying ratio Vg/Vt of output voltage Vg to target voltage Vt (or ratio I/It of output current I to target current It) to first motor torque instruction value Tt as the target.

Unlike target motor torque determining part 8C of the first embodiment in which the motor torque corresponding to the present operating point is used as the torque instruction value, in the third embodiment the motor torque corresponding to the operating point with the optimum overall efficiency of the generator 7 and the motor 4 is taken as the torque instruction value.

Figure 18:
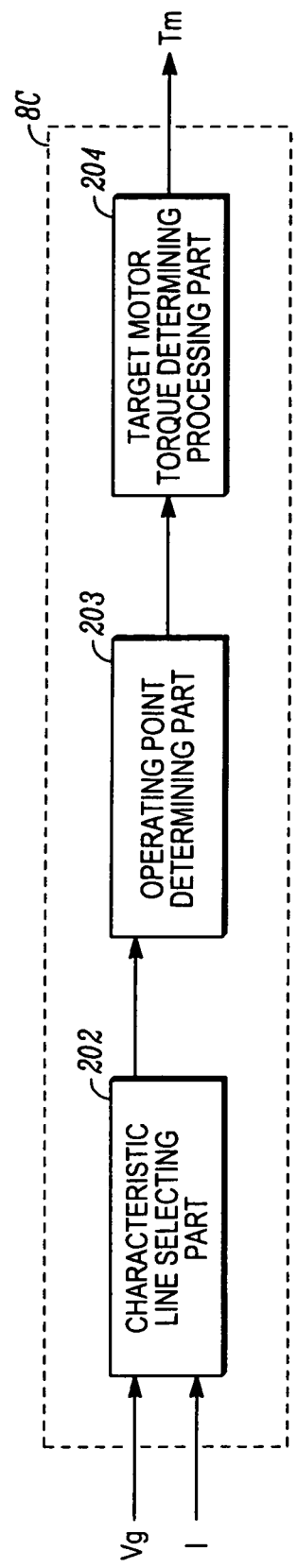
FIG. 18 is a block diagram illustrating the target motor torque determining part shown in FIG. 3 in a third embodiment.

As shown in FIG. 18, target motor torque determining part 8C in the third embodiment includes a characteristic line selecting part 202 that selects output possible characteristic line St that can be output from generator 7 on the basis of output voltage Vg and output current I of generator 7. It also includes operating point determining part 203 that determines the operating point on output possible characteristic line St selected by characteristic line selecting part 202. Further, target motor torque determining part 8C includes target motor torque determining processing part 204 that computes torque instruction value from the electric power at the operating point determined with operating point determining part 203.

In characteristic line selecting part 202, the pre-stored map is taken as a reference, and output possible characteristic line St containing the present operating point $\alpha_0$ (V, I) is selected. Also, one may use the linear approximation formula (11) listed below to make a selection when the output possible characteristic line in the actual control region decreases monotonically, and this linear approximation method is sufficient for the practical application.

$$Vg = -a \times I + V_0 \quad (11)$$

Here, $V_0$ represents the intercept on the voltage axis (V-axis intercept), and it is the voltage when the current is zero. Also, a is a constant preset on the basis of the characteristics of the generator 7 or may also be taken as a variable constant with the rotation velocity and field current as parameters so as to get a higher precision.

Figure 19:
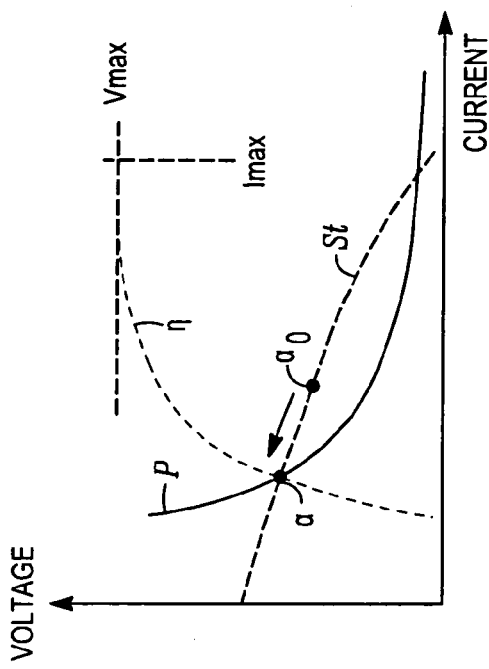
FIG. 19 is a graph illustrating a method of determining the operating point in the operating point determining part.

As shown in FIG. 19, in operating point determining part 203 operating point a with the optimum overall efficiency of generator 7 and motor 4 is determined on output possible characteristic line St selected by characteristic line selecting part 202. More specifically, maximum efficiency operating point line η corresponding to the maximum overall efficiency is pre-stored, and the intersection between maximum efficiency operating point line η and output possible characteristic line St is taken as operating point α.

Then, motor's electric power PM is computed by multiplying motor efficiency ηm to the electric power determined from the voltage and current at operating point α. The result is output to target motor torque determining part 204. In target motor torque determining processing part 204, torque instruction value is computed from motor's electric power PM and motor rotating velocity Vm.

In this way, in the third embodiment the operating point with the maximum overall efficiency of the generator 7 and motor 4 is selected on the output possible characteristic line containing the present operating point of the generator 7. The second motor torque instruction value Tm is computed from that present operating point. Consequently, the motor 4 can always work at the optimum efficiency.

Figure 20:
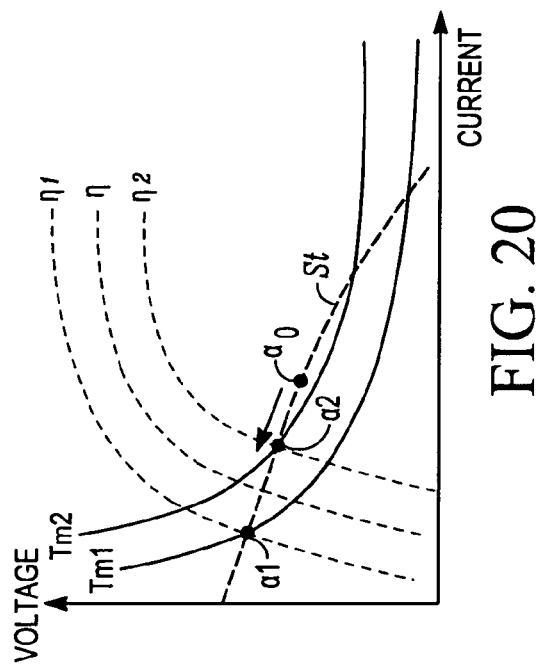
FIG. 20 is a graph illustrating another example of the operating point determining method in the third embodiment.

In this third embodiment, explanation has been made of the case when the operating point is selected to have the maximum overall efficiency of the generator 7 and motor 4. However, the present invention is not limited to this scheme. For example, one may adopt another scheme to select the operating point as long as the overall efficiency is over a preset value. In this case, as shown in FIG. 20, high-efficiency operating point lines η1, η2 with the overall efficiency over a preset value are selected to sandwich maximum efficiency operating point line η between them. Second motor torque instruction value Tm is determined such that operating point a enters between the two high-efficiency operating point lines η1, η2. That is, motor torque values Tm1, Tm2 correspond to operating points α1, α2 as the two intersections between two high-efficiency operating points η1, η2 and output possible characteristic line St. The motor torque value between the two values Tm1, Tm2 is selected as second motor torque instruction value Tm. As a result, the motor can always work at a higher efficiency than the preset value.

The fourth embodiment differs from the third embodiment, which has the motor torque corresponding to the operating point with the optimum overall efficiency of the generator 7 and motor 4 as the second motor torque instruction value Tm, in that the motor torque corresponding to the operating point having the maximum, the output electric power of the generator 7 is taken as the second motor torque instruction value Tm.

Figure 21:
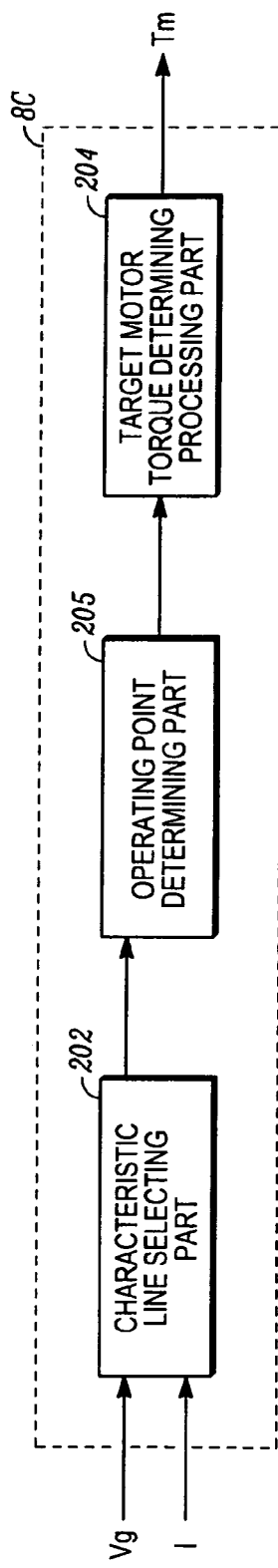
FIG. 21 is a block diagram illustrating the target motor torque determining part shown in FIG. 3 in a fourth embodiment.

That is, the processing is performed in FIG. 21 the same as in FIG. 18 except that in operating point determining part 205 of target motor torque determining part 8C, the operating point with the maximum generated power is determined on the output possible characteristic line St containing the present operating point.

In operating point determining part 205, the combination of voltage Vg and current I is selected such that the value of the electric power when the operating point of generator 7 on output possible characteristic line St selected by characteristic line selecting part 202 is at a maximum. When the simple model is taken in consideration of the case, one may select the point with the maximum value of the product of voltage Vg and current I. Also, in the characteristic line selecting part 202 when the linear approximation is adopted to select output possible characteristic line St, one may simply select the point on the rightmost side in the range where the linear approximation can be adopted (i.e., the point with the highest current).

Then, motor's electric power PM is computed by multiplying motor efficiency ηm with the electric power determined from the voltage and current at the operating point selected as described above, and the result is output to target motor torque determining processing part 204.

In this way, in the fourth embodiment the operating point is selected to have the maximum output electric power of the generator 7 when the voltage and current move on the output possible characteristic line of the generator 7, and the second motor torque instruction value Tm of the motor is computed from the operating point. Consequently, the motor 4 can always work with optimum efficiency.

The fifth embodiment differs from the third embodiment, which takes the motor torque corresponding to the operating point with the optimum overall efficiency of the generator 7 and motor 4 as the second motor torque instruction value Tm, in that the motor torque corresponding to the operating point with the optimum motor efficiency is taken as the second motor torque instruction value Tm. That is, for operating point determining part 206 of target motor torque determining part 8C shown in FIG. 22, the processing of the fifth embodiment is the same as that shown in FIG. 18 except that the operating point is determined to have the maximum motor efficiency on the output possible characteristic line St containing the present operating point.

In operating point determining part 206, the operating point line with the maximum motor efficiency is pre-stored, and the intersection between the maximum efficiency operating point line η and output possible characteristic line St is selected. Then, motor electric power PM is computed by multiplying motor efficiency ηm with the electric power determined from the voltage value and current value at the operating point selected as explained above. The result is then output to target motor torque determining processing part 204.

In this way, in the fifth embodiment the operating point is selected to have the maximum motor efficiency on the output possible characteristic line St of the motor 4, and the second motor torque instruction value Tm of the motor 4 is computed from the operating point. Consequently, the motor 4 can always work at optimum efficiency.

In this fifth embodiment, explanation has been made on the case when the operating point is selected to have the maximum motor efficiency. The present invention is not, however, limited to this scheme. Any scheme may be adopted as long as the operating point is selected so that the motor efficiency is over a preset value.

The sixth embodiment differs from the third embodiment, which takes the motor torque corresponding to the operating point with the optimum overall efficiency of the generator 7 and motor 4 as the second motor torque instruction value Tm, in that the motor torque corresponding to the operating point having the optimum efficiency of the generator 7 is taken as the second motor torque instruction value Tm.

Figure 23:
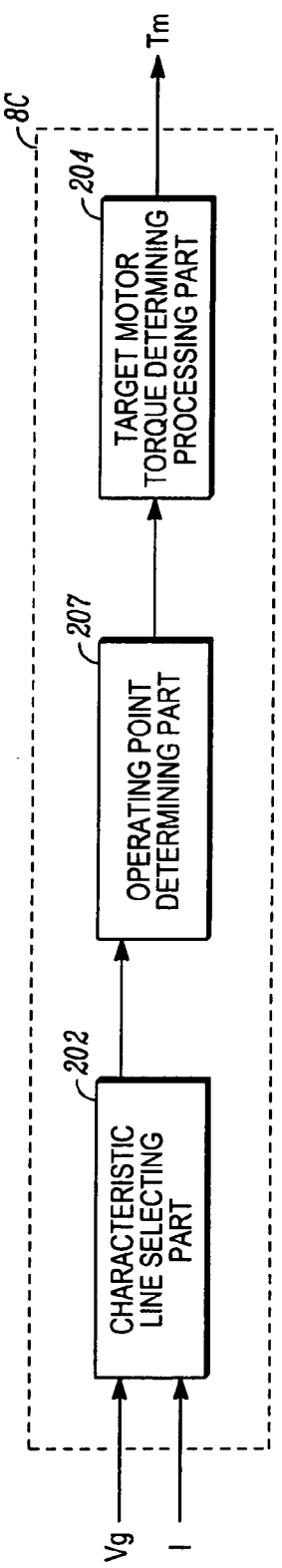
FIG. 23 is a block diagram illustrating the target motor torque determining part shown in FIG. 3 in a sixth embodiment.

That is, for operating point determining part 207 of target motor torque determining part 8C shown in FIG. 23, the processing of the sixth embodiment is the same as that shown in FIG. 18 except that the operating point having the maximum efficiency of the generator 7 on the output possible characteristic line St containing the present operating point is determined.

In operating point determining part 207, the operating point line with the maximum efficiency of the generator 7 is pre-stored, and the intersection between the maximum efficiency operating point line η and output possible characteristic line St is selected. Then, motor electric power PM is computed by multiplying motor efficiency ηm with the electric power determined from the voltage and current at the operating point selected as mentioned above, and the result is output to target motor torque determining processing part 204.

Accordingly, in the sixth embodiment the operating point with the maximum efficiency of the generator 7 is selected on the output possible characteristic line St of the generator 7, and the second motor torque instruction value Tm of the motor 4 is computed from the operating point. Consequently, the motor 4 can always work at optimum efficiency.

In this sixth embodiment, the case when the operating point with the maximum efficiency of the generator 7 is selected was explained. Again, the present invention is not limited to this scheme. One may also adopt other schemes as long as the operating point is selected so that the efficiency of the generator 7 is over a preset value.

The seventh embodiment differs from the third embodiment, which takes the motor torque corresponding to the operating point with the optimum overall efficiency of the generator 7 and motor 4 as the second motor torque instruction value Tm, in that the motor torque corresponding to the operating point having the maximum value of the product of the overall efficiency of the generator 7 and the motor 4, and the output electric power of the generator 7 is taken as the second motor torque instruction value Tm.

Figure 24:
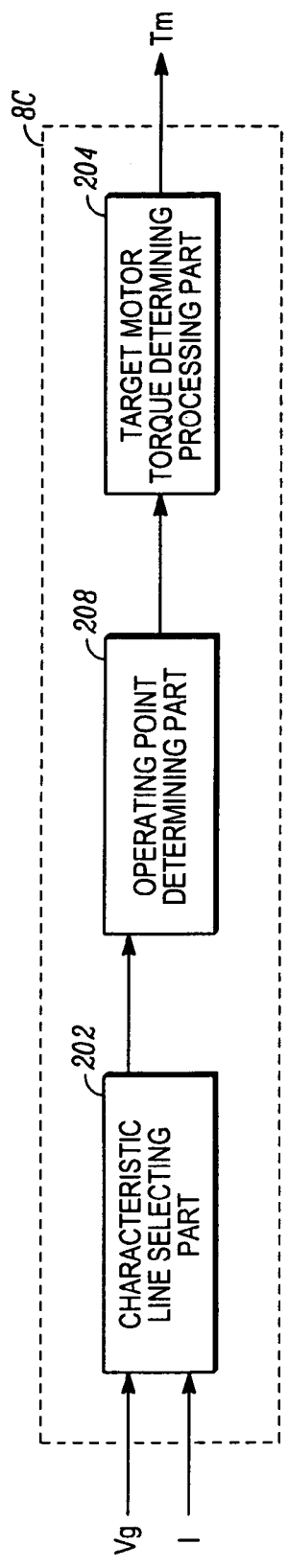
FIG. 24 is a block diagram illustrating the target motor torque determining part shown in FIG. 3 in a seventh embodiment.

That is, for operating point determining part 208 of target motor torque determining part 8C shown in FIG. 24, the processing of the present embodiment is the same as that shown in FIG. 18 except that the operating point having the maximum value of the product of the overall efficiency of the generator 7 and the motor 4, and the output electric power of the generator 7 is determined.

In operating point determining part 208, at each operating point on output possible characteristic line St, the overall efficiency of the motor 4 is multiplied by the electric power (=V×I), and the operating point with the maximum product value, that is, the operating point that can expect the maximum motor torque, is selected. Then, motor electric power PM is computed by multiplying motor efficiency ηm with the electric power determined from the voltage and current at the operating point selected as previously mentioned. The result is output to target motor torque determining processing part 204.

In this way, in the seventh embodiment the operating point with the maximum value of the product of the overall efficiency of the generator 7 and motor 4 and the output electric power of the generator 7 on the output possible characteristic line St of the generator 7 is selected, and the second motor torque instruction value Tm of the motor 4 is computed from the operating point. Consequently, the motor 4 can always work at optimum efficiency.

Figure 25:
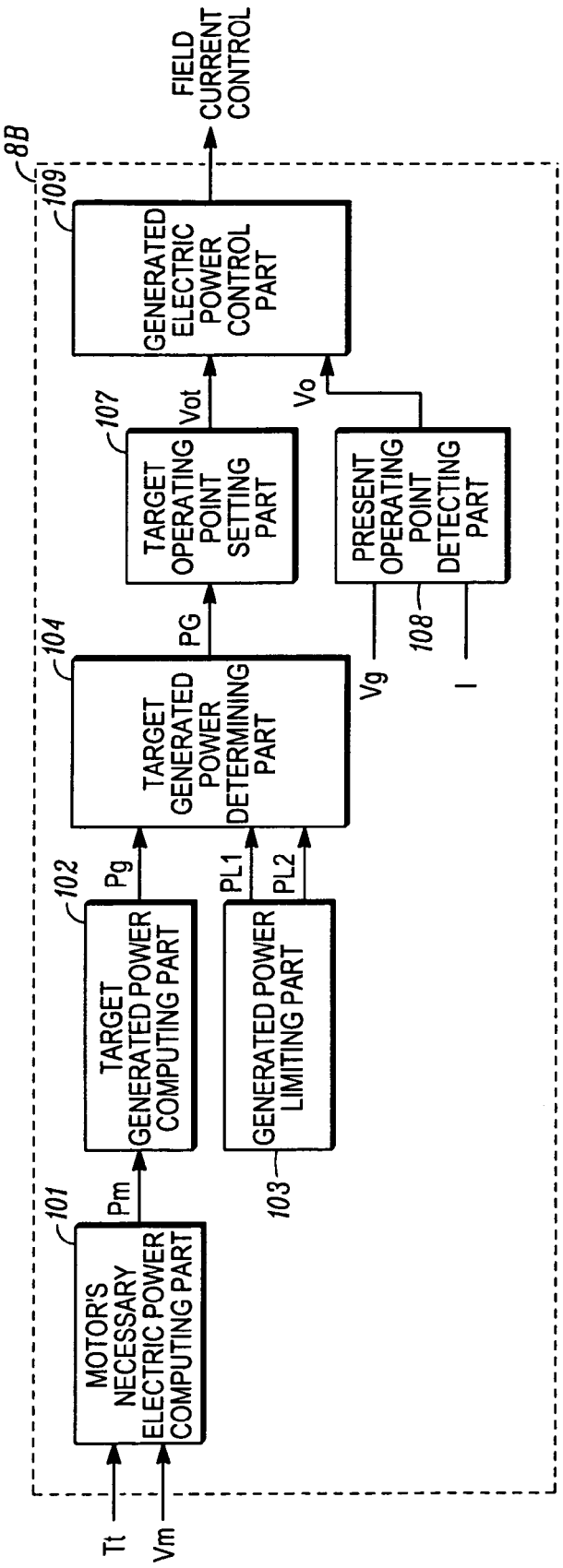
FIG. 25 is a block diagram illustrating the generator control part shown in FIG. 3 in an eighth embodiment.

In the eighth embodiment of the present invention, feedback control is performed so that the present output possible characteristic line of the generator 7 becomes the output possible characteristic line as the target with generator's control part 8B. That is, as shown in FIG. 25, in the eighth embodiment generator's control part 8B performs the following operation. Target operating point setting part 105 shown in FIG. 6 is replaced by target operating point setting part 107 that outputs V-axis intercept $V_0t$ of output possible characteristic line St containing the target operating point from target output electric power PG. Present operating point detecting part 108 outputs V-axis intercept $V_0$ of output possible characteristic line St containing the present operating point (V, I). Finally, generated power control part 106 is replaced by generated power control part 109 that controls such that V-axis intercept $V_0$ detected by present operating point detecting part 108 becomes target V-axis intercept $V_0t$ set by target operating point setting part 107. Otherwise, the processing is the same as that shown in FIG. 6, and the same part numbers as those adopted in FIG. 6 are adopted. They will not be explained again.

In target operating point setting part 107, just as in target operating point setting part 105, first of all, first motor torque instruction value Tt is computed on the basis of target output electric power PG, that is, the motor's usable electric power, output from target generated power determining part 104. Then, as shown in FIG. 8, the target operating point (Vt, It) of generator 7 is selected as the intersection between constant electric power line P corresponding to motor's usable electric power PG and maximum efficiency operating point line η.

Figure 26:
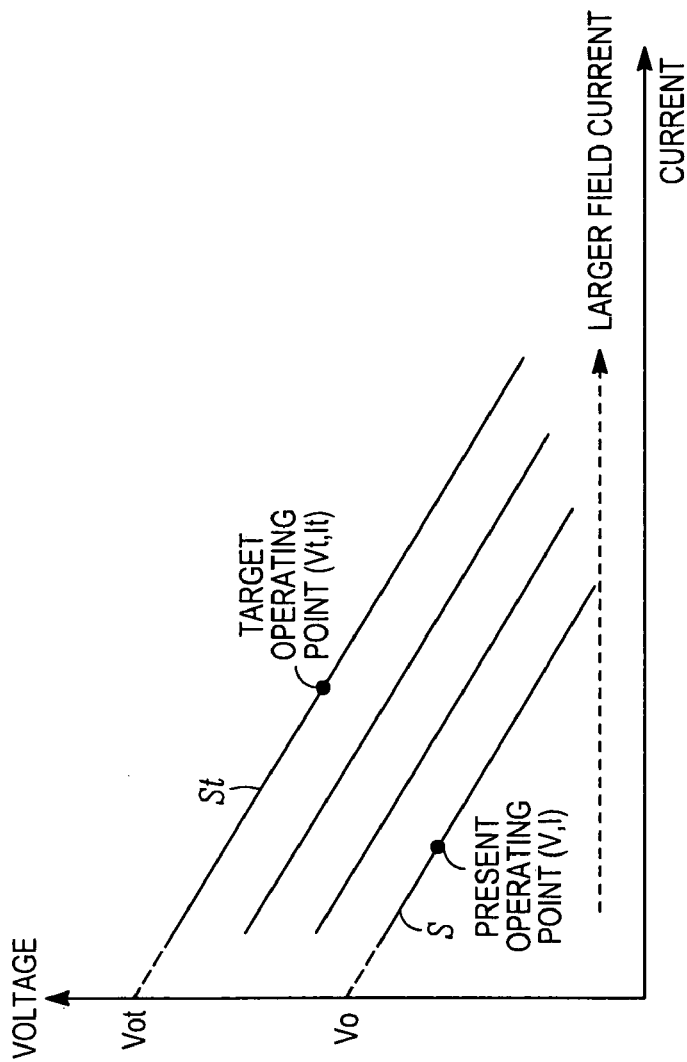
FIG. 26 is a graph illustrating control of the generator in the eighth embodiment.

Then, target V-axis intercept $V_0t$ of output possible characteristic line St containing the target operating point (Vt, It) shown in FIG. 26 is computed. More specifically, on the basis of target voltage Vt and target current It, target V-axis intercept $V_0t$ is computed on the basis of the linear approximate formula $Vt=-a \times It+V_0t$ of output possible characteristic line St.

Figure 22:
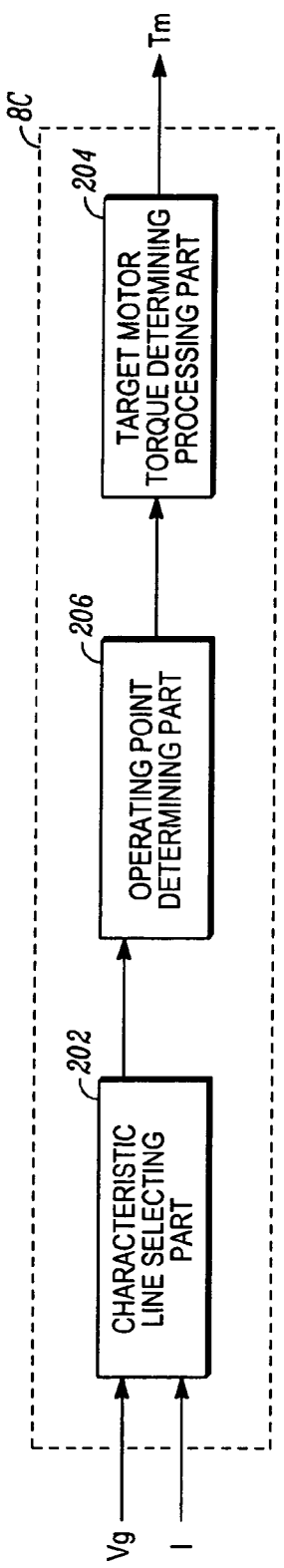
FIG. 22 is a block diagram illustrating the target motor torque determining part shown in FIG. 3 in a fifth embodiment.

In present operating point detecting part 108, V-axis intercept $V_0$ of the output possible characteristic line S containing the present operating point (V, I) shown in FIG. 22 is computed. More specifically, on the basis of the present voltage V and current I, V-axis intercept $V_0$ is computed on the basis of the linear approximate formula $V=-a \times I+V_0$ of output possible characteristic line S.

In generated power control part 109, corresponding to the relative magnitudes of V-axis intercept $V_0$ and target V-axis intercept $V_0t$, control is performed to adjust field current Ifg of generator 7.

For example, even when the voltage and current vary due to variation in the input impedance on the inverter side, because the voltage and current move on the output possible characteristic line of the generator, there is no change in the V-axis intercept. Consequently, by having V-axis intercept $V_0$ in agreement with target V-axis intercept $V_0t$, it is possible to eliminate the difference between present output possible characteristic line S and target output possible characteristic line St.

However, as a method to eliminate the difference between present output possible characteristic line S and target output possible characteristic line St, it is thought that one can compare the relationship between output possible characteristic lines S and St by means of the nonlinear map. However, in the actual controlled region, as the output possible characteristic line decreases monotonically, the method with the linear approximation is sufficient for practical applications.

Figure 27:
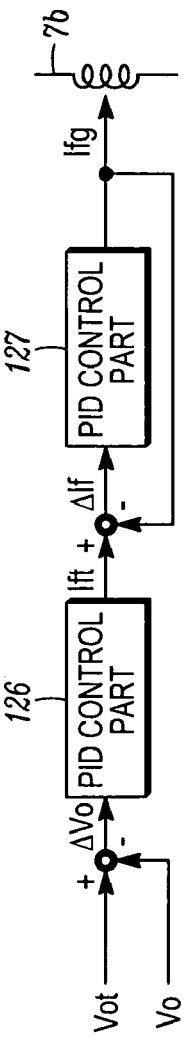
FIG. 27 is a block diagram illustrating the generated electric power control part in the eighth embodiment.

FIG. 27 is a block diagram illustrating generated power control part 109 in additional detail.

First of all, difference $\Delta V_0$ between target V-axis intercept $V_0t$ from target operating point setting part 107 and V-axis intercept $V_0$ is input to PID control part 126, and PID control part 126 outputs target field current Ift such that difference $\Delta V_0$ becomes zero.

Then, difference $\Delta$If between actual field current Ifg and target field current Ift detected with the field current sensor is determined and output to PID control part 127. PID control part 127 controls actual field current Ifg such that difference ΔIf becomes zero.

As a result, V-axis intercept $V_0$ agrees with target V-axis intercept $V_0t$. As explained above, in the eighth embodiment, in consideration of the output possible characteristic line of the generator, feedback control is performed for the field current of the generator such that the difference between the output possible characteristic line containing the target operating point and the output possible characteristic line containing the present operating point is eliminated.

Also, because the field current of the generator is controlled such that the V-axis intercept of the present output possible characteristic line becomes the V-axis intercept of the target output possible characteristic line. Consequently, it is possible to perform stable control of the generator without being influenced by the variation in the input impedance on the inverter side.

In the eighth embodiment, explanation has been made of the case in which generated power control part 109 tracks target field current Ift while monitoring actual field current Ifg of generator 7. However, the present invention is not limited to this scheme. It is also possible to perform PWM control for the generator's field current just as in FIG. 13. In this case, control is performed such that the difference between target V-axis intercept $V_0t$ and V-axis intercept $V_0$ becomes zero.

As in FIG. 15, one may also adopt a scheme in which feedback control is performed by generated power control part 109 for the value of the product of field power source voltage Vf and PWM duty ratio D. In this case, PID control is performed on the difference between target V-axis intercept $V_0t$ and V-axis intercept $V_0$.

Also, in these embodiments, the case in which target motor torque determining part 8C takes the motor torque corresponding the present operating point as the torque instruction value Tm, or it takes the motor torque corresponding to the operating point with the optimum overall efficiency of the generator and the motor as the torque instruction value Tm was explained. However, the present invention is not limited to this scheme. One may also adopt a scheme as a combination of the methods in determining the torque instruction value Tm in the first through seventh embodiments.

This application is based on Japanese Patent Application Nos. 2005-115931, filed Apr. 13, 2005 and 2005-323701, filed Nov. 8, 2005, in the Japanese Patent Office, the entire contents of which are hereby incorporated by reference.

Also, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A driving force controller for a vehicle having first driving wheels and second driving wheels, comprising:
    a engine for driving the first driving wheels;
    a generator driven by the engine;
    an AC motor for receiving power generated by the generator and driving the second driving wheels;
    an inverter between the generator and the AC motor;
    means for computing a motor's necessary electric power needed for the AC motor; and
    means for controlling the generator based on the motor's necessary electric power and the AC motor by controlling the inverter based on an output state of the generator.

2. A driving force controller for a vehicle having first driving wheels and second driving wheels, comprising:
    an engine for driving the first driving wheels;
    a generator driven by the engine;
    an AC motor for receiving power generated by the generator and driving the second driving wheels;
    an inverter between the generator and the AC motor;
    a motor's necessary electric power computing part operable to compute a motor's necessary electric power needed for the AC motor;
    a generation control part operable to control the generator on the basis of the motor's necessary electric power; and
    a motor control part operable to control the AC motor by controlling the inverter on the basis of an output state of the generator.

3. The driving force controller according to claim 2, further comprising:
    a sensor for detecting the output state of the generator.

4. The driving force controller according to claim 2, further comprising:
    a field coil of the generator for generating a field; and wherein the generation control part further comprises a field control part operable to control the field generated by the field coil on the basis of the motor's necessary electric power.

5. The driving force controller according to claim 2 wherein the motor control part further comprises a torque instruction value computing part that computes a torque instruction value of the AC motor on the basis of the output state of the generator; and wherein the motor control part is further operable to control the AC motor by controlling the inverter on the basis of the torque instruction value.

6. The driving force controller according to claim 5, further comprising:
    a voltage sensor that detects an output voltage of the generator; and
    a current sensor that detects an output current of the generator; wherein the torque instruction value computing part includes an output power computing part operable to compute the actual output electric power of the generator based on the output voltage detected with the voltage sensor and the output current detected with the current sensor; and wherein the torque instruction value is a driving force obtained when the actual output electric power is fed to the AC motor.

7. The driving force controller according to claim 5 wherein the torque instruction value computing part is operable to compute the torque instruction value based on at least one of: a product of a driving force of the AC motor and a ratio of a current generator output value to a target generator output value needed for generating a desired driving force of the AC motor; an output characteristic line of the generator including an operating point determined by the generator output voltage and the generator output current; an operating point where overall efficiency of the generator and the AC motor is at a maximum on the output characteristic line; an operating point where an output electric power of the generator is at a maximum on the output characteristic line; an operating point where an efficiency of at least one of the AC motor and the generator is at a maximum on the output characteristic line; and an operating point where a product of an overall efficiency of the generator and the AC motor and the output electric power of the generator is at a maximum on the output characteristic line.

8. The driving force controller according to claim 2, further comprising:
a target operating point setting part operable to set a target operating point of the generator; and
a generator's output control part operable to control a field of the generator based on the target operating point.

9. The driving force controller according to claim 8 wherein the target operating point setting part is further operable to set an operating point corresponding to a maximum overall efficiency of the generator and the AC motor as the target operating point.

10. The driving force controller according to claim 8 wherein the generator's output control part is operable to control the field of the generator such that one of: a generator output voltage becomes a voltage of the target operating point; and a present output characteristic line of the generator including an operating point determined by the generator output voltage and a generator output current becomes a target output characteristic line of the generator including the target operating point.

11. The driving force controller according to claim 10 wherein the present output characteristic line of the generator is linear; and wherein the generator's output control part is further operable to control the field of the generator such that an intercept of the present output characteristic line of the generator becomes an intercept of the target output characteristic line of the generator.

12. The driving force controller according to claim 8, further comprising:
a field current detector that detects a field current of the generator; and wherein the generator's output control part is operable to perform feedback control of the field current detected by the field current detector such that an operating point determined by a generator output voltage and a generator output current becomes the target output point.

13. The driving force controller according to claim 8, further comprising:
a field current driver of the generator; and wherein the generator's output control part further comprises a duty ratio control part operable to control a PWM duty ratio of the field current driver such that an operating point determined by a generator output voltage and a generator output current becomes the target output point.

14. The driving force controller according to claim 13 wherein the duty ratio control part is operable to set the PWM duty ratio corresponding to a magnitude of a power source voltage of the field current driver.

15. The driving force controller according to claim 2 wherein the output state of the generator is at least one of an output voltage and an output current of the generator.

16. A method of controlling driving force for a vehicle having first driving wheels and second driving wheels, comprising:
driving the first driving wheels using an engine;
driving a generator using the engine;
driving the second driving wheels using an AC motor receiving power generated by the generator;
computing a motor's necessary electric power needed for the AC motor;
controlling the generator based on the motor's necessary electric power; and
controlling the AC motor based on an output state of the generator.

17. The method according to claim 16, further comprising:
controlling an inverter based on the output state of the generator, the inverter located between the generator and the AC motor; and wherein controlling the AC motor based on the output state of the generator includes controlling the AC motor by controlling the inverter.

18. The method according to claim 17, further comprising:
computing a torque instruction value of the AC motor based on the output state of the generator; and wherein controlling the inverter based on the output state of the generator further includes controlling the inverter based on the torque instruction value.

19. The method according to claim 18, further comprising:
detecting an output voltage of the generator;
detecting an output current of the generator;
computing the actual output electric power of the generator based on the output voltage and the output current; and
obtaining a driving force when the actual output electric power is fed to the AC motor, the driving force being the torque instruction value.

20. The method according to claim 18 wherein computing the torque instruction value further comprises computing the torque instruction value based upon at least one of:
a product of a driving force of the AC motor multiplied by a ratio of a generator current output value to a generator target output value necessary for generating a desired driving force of the AC motor;
an output characteristic line of the generator including an operating point determined by the generator output voltage and the generator output current;
an operating point where overall efficiency of the generator and the AC motor is at a maximum on the output characteristic line;
an operating point where an output electric power of the generator is at a maximum on the output characteristic line;
an operating point where an efficiency of at least one of the AC motor and the generator is at a maximum on the output characteristic line; and
an operating point where a product of an overall efficiency of the generator and the AC motor and the output electric power of the generator is at a maximum on the output characteristic line.

21. The method according to claim 16, further comprising:
detecting the output state of the generator using a sensor; and wherein controlling the AC motor based upon the output state of the generator further includes using an output of the sensor.

22. The method according to claim 16, further comprising:
generating a field of the generator using a field coil; and wherein controlling the generator further includes controlling the field generated by the field coil on the basis of the motor's necessary electric power.

23. The method according to claim 16, further comprising:
setting a target operating point of the generator; and
controlling a field of the generator based on the target operating point.

24. The method according to claim 23 wherein controlling a field of the generator further comprises controlling the field of the generator such that one of: a generator output voltage becomes a voltage of the target operating point, and a present output characteristic line of the generator including an operating point determined by the generator output voltage and a generator output current becomes a target output characteristic line of the generator including the target operating point.

25. The method according to claim 24 wherein the present output characteristic line of the generator is linear; and wherein controlling the field of the generator further includes controlling the field of the generator such that an intercept of the present output characteristic line of the generator becomes an intercept of the target output characteristic line of the generator.

26. The method according to claim 23, further comprising:

detecting a field current of the generator; and performing feedback control of the field current such that an operating point determined by the generator output voltage and the generator output current becomes the target output point.

27. The method according to claim 23 wherein the generator includes a field current driver, the method further comprising:

controlling a PWM duty ratio of the field current driver such that an opening point determined by a generator output voltage and a generator output current becomes the target output point.

28. The method according to claim 27, further comprising: setting the PWM duty ratio corresponding to a magnitude of a power source voltage of the field current driver.

29. The method according to claim 23, further comprising: setting an operating point corresponding to a maximum overall efficiency of the generator and the AC motor as the target output point.

30. The method according to claim 16 wherein the output state of the generator is at least one of an output voltage and an output current of the generator.

* * * * *